United States Patent

Kapilow

[11] 3,880,531
[45] *Apr. 29, 1975

[54] MOLD FOR WRITING IMPLEMENT BARREL OR THE LIKE

[76] Inventor: Marvin Kapilow, 8 Sound Rd., Rye, N.Y. 10580

[*] Notice: The portion of the term of this patent subsequent to Nov. 13, 1990, has been disclaimed.

[22] Filed: Oct. 24, 1973

[21] Appl. No.: 409,048

Related U.S. Application Data

[63] Continuation-in-part of Ser. No. 360,070, May 14, 1973, Pat. No. 3,836,265, which is a continuation-in-part of Ser. No. 257,357, May 26, 1972, Pat. No. 3,771,882.

[52] U.S. Cl.................................. 401/80; 401/82
[51] Int. Cl............................................. B43k 21/06
[58] Field of Search......................... 401/80, 82–84, 401/109–112

[56] References Cited
UNITED STATES PATENTS
3,771,882  11/1973  Kapilow............................... 401/80

*Primary Examiner*—Lawrence Charles
*Attorney, Agent, or Firm*—Kane, Dalsimer, Kane, Sullivan and Kurucz

[57] ABSTRACT

An improved mold for molding a one-piece, integral, tubular barrel for a writing implement or the like is provided. The mold includes a female part having an elongated cavity therein and a mold core part adapted to fit in the cavity. The core part includes a central pin extending from the forward portion coaxial with the core shank portion. The pin floats freely within the female mold and is supported by a plurality of supports spaced rearwardly of the core forward end. The supports are affixed to one of the mold parts to engage the other part. A molding method incorporating the improved mold and the product of the mold are also disclosed.

5 Claims, 8 Drawing Figures

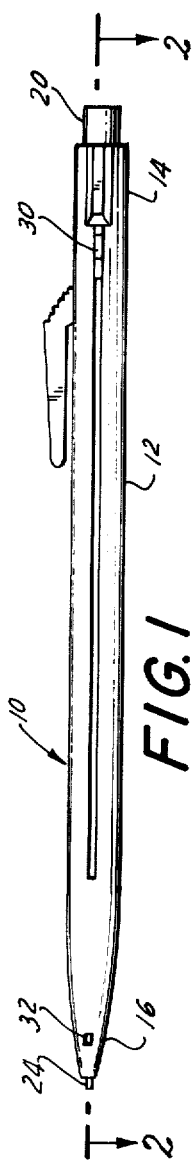
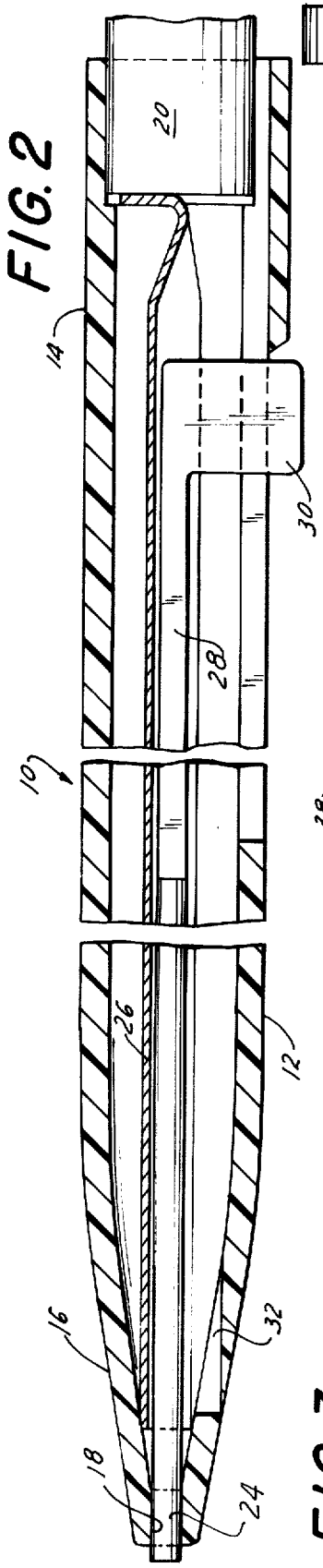
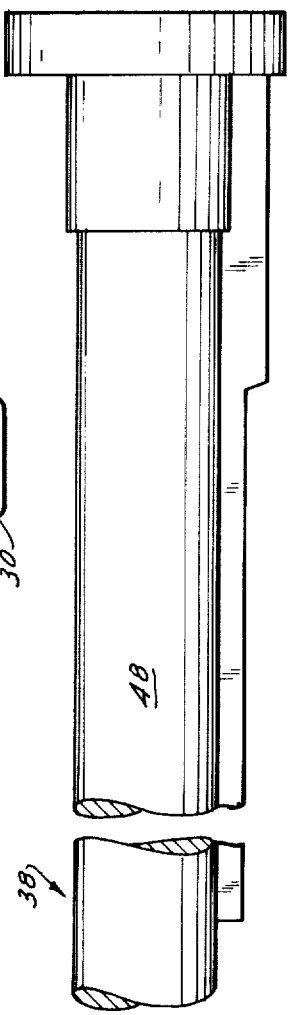
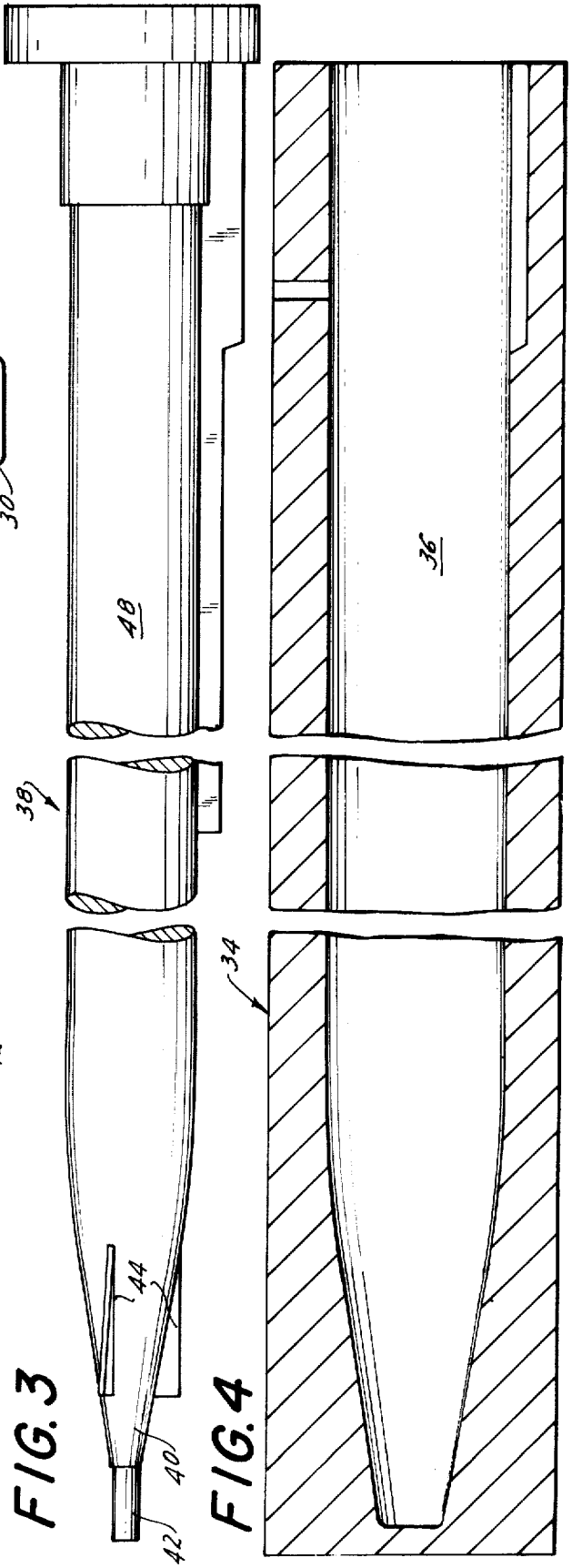

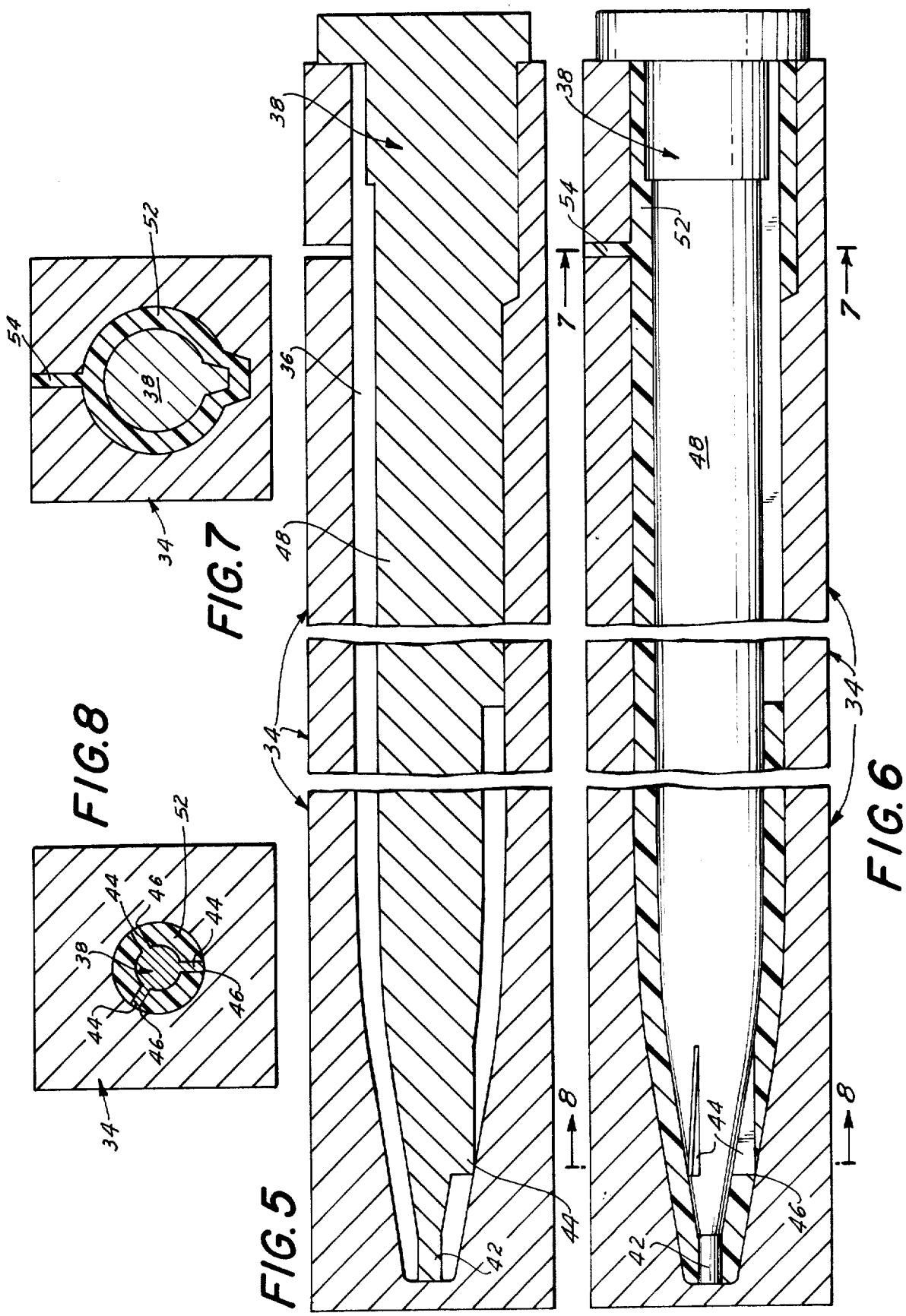

MOLD FOR WRITING IMPLEMENT BARREL OR THE LIKE

BACKGROUND OF THE INVENTION

This application is a continuation-in-part of Ser. No. 360,070 filed May 14, 1973, now U.S. Pat. No. 3,836,265 which was a continuation-in-part of Ser. No. 257,357, filed May 26, 1972, now U.S. Pat. No. 3,771,882.

In my copending patent applications Ser. Nos. 257,357 filed May 26, 1972 now U.S. Pat. No. 3,771,882, issued Nov. 13, 1973 and 360,070 filed May 14, 1973, now U.S. Pat. No. 3,836,265 issued Sept. 17, 1974 there is disclosed a disposable, mechanical pencil which includes a tubular barrel having a forward, tapered end through which the lead is adapted to project. The forward end of the barrel is provided with an opening, the diameter of which is substantially equal to that of the lead.

It is the principal object of the present invention to provide a suitable mold for forming the tubular barrel part or other similar components.

A further object is to provide a molding method by which the molds may be utilized to produce the desired parts. A still further object is to provide the product of the mold.

SUMMARY OF THE INVENTION

The above and other beneficial objects and advantages are attained in accordance with the present invention by providing a mold for molding a one-piece, integral, tubular barrel for a writing implement or the like having a forward end with a reduced opening coaxially communicating with a bore extending through the barrel. The mold comprises a female mold part having an internal cavity, an elongated mold core part adapted to fit into the female mold part cavity, a pin extending outwardly from the center of the forward end of the core, and, at least, one pin support affixed to one of the mold parts spaced rearwardly of the forward end adapted to engage the other of the mold parts to support the pin and prevent breakage of the pin when the mold is subjected to increased pressure during molding.

The method of forming the desired tubular barrel comprises the steps of positioning the elongated mold core part in the female mold part cavity with the core pin freely floating. The core pin is supported by means of the supports spaced rearwardly of the pin which enable the pin to withstand molding pressures when a plastic molding material is introduced into the cavity under suitable heat and pressure conditions.

The product of the molding method and disclosed mold is a one-piece, integral, molded, plastic, tubular barrel having a rear end and a tapered forward end. The barrel has a bore of substantially uniform diameter throughout the forward end including spaced slots caused by pin supports of a mold core engaging surfaces of a female mold to prevent breakage of the pin during molding. The tapered, forward end of the barrel has a coaxial, reduced opening forwardly of the slots communicating with the bore. The reduced opening includes a substantially cylindrical portion, the diameter of which is substantially that of writing lead adapted to project through the opening whereby to minimize wobbling of the lead when only a relatively small part thereof is not consumed during use of the writing implement.

BRIEF DESCRIPTION OF THE DRAWINGS

In the accompanying drawings:

FIG. 1 is an elevational view of a mechanical pencil assembly the barrel of which is produced in accordance with the present invention;

FIG. 2 is an enlarged fragmentary longitudinal sectional view taken along the line 2—2 of FIG. 1 showing the interior and operating mechanism of the assembly;

FIG. 3 is an elevational view of a mold core utilized in producing the tubular barrel portion of the assembly;

FIG. 4 is a side elevational sectional view of a female mold part;

FIG. 5 is a side elevational sectional view of the male and female parts assembled and in condition to receive a charge of plastic;

FIG. 6 is a view similar to FIG. 5 except that only the female mold part is shown in section and plastic material is shown introduced into the assembled mold parts;

FIG. 7 is a sectional view taken along reference lines 7—7 of FIG. 6 in the direction indicated by the arrows; and FIG. 8 is a sectional view taken along reference lines 8—8 of FIG. 6 in the direction indicated by the arrows.

DETAILED DESCRIPTION OF THE PREFERRED EMBODIMENT

In the accompanying drawings a mechanical pencil assembly 10 such as that described in detail in the previously mentioned copending applications is shown. The assembly 10 includes an outer barrel or shell 12 having a rear end 14 and tapered, forward end 16. The forward end 16 terminates in a reduced opening 18. A conventional eraser 20 is disposed in the rear open end of barrel 12. As described in detail in the aforementioned applications, the charge of lead 24 is supported interiorly of the barrel by a tube 26. A carrier 28 frictionally engages the rear of the lead rod to prevent the lead from being pushed back into the tube under normal writing pressure. A handle 30 forming an extension of the carrier permits the carrier to be pushed forwardly thereby forcing the front of the lead through the opening 18 in the forward end of the barrel.

In order to prevent the lead from wobbling particularly when most of it has already been consumed the reduced opening 18 extends through a cylindrical portion of the forward end of the barrel and the diameter of the opening is substantially that of the lead. This dimension is generally of a size to accommodate lead 0.020 to 0.075 in for conventional pencil applications. In a successful commercial application this dimension was 0.0455 to 0.047 in. As will be explained in more detail forthwith, the reduced, tapered end 16 of the pencil includes three equally spaced recesses 32 formed from the male core die of the mold from which the tubular barrel part is formed. In this connection, the barrel may be fabricated of any low-cost, easily moldable material and in a successful application of the invention, has been molded of polystyrene.

In FIGS. 3 and 4, the mold parts for foming barrel 12 in one integral piece are illustrated. In FIG. 4 a female mold part 34 is shown having an internal cavity 36 generally in the shape of the barrel. In FIG. 3 an elongated mold core part 38 adapted to fit within the female part cavity 36 is illustrated. Core 38 comprises an elongated, generally tubular member having a shank portion 48 of substantially uniform diameter and a tapered forward end section 40 from which a pin 42 coaxially extends forwardly. The diameter of pin 42 is substantially that of the opening 18 through the barrel and hence equal to the diameter of the lead of the pencil assembly. The forward end of the core 38 tapers and three spaced ribs 44 extend outwardly from the core body.

As shown in FIGS. 5, 6 and 8, the ribs 44 engage with surfaces 46 of the female mold part and thereby take the weight off the core pin 42 during molding so that the pin may freely float within the female mold (as distinct from being captured within a recess in the female mold part) without damage or breaking of the pin.

The one-piece, tubular barrel 12 of assembly 10 is formed by positioning the mold core part 38 in the female mold part 34 with pin 42 freely floating within the mold cavity supported in position by ribs 44 which extend outwardly from the core. A suitable plastic resin 52 is introduced into the space between the mold parts through an opening 54 thereby filling the void between the parts to produce the desired shape. In this connection, because the ribs 44 contact the female mold part, cavities 32 are formed. Alternatively, these ribs may extend inwardly from the female part surfaces 43 into engagement with the core part 38.

Thus, in accordance with the above, the several aforementioned objects and advantages are most effectively attained. It should be understood that the present invention is in no sense limited to the detailed description set forth above and its scope is to be determined by that of the claims which follow forthwith.

Having thus described the invention, what is claimed is:

1. A one-piece integral, molded plastic tubular barrel for a writing implement, said barrel having a rear end and a tapered forward end, said barrel intermediate its ends having a bore of substantially uniform diameter throughout, the forward end including spaced slots caused by pin supports of interengaging surfaces of a mold core and a female mold to prevent breakage of the pin during molding, the tapered forward end having a coaxial reduced opening forwardly of the slots and communicating with the bore.

2. The invention in accordance with claim 1, wherein the reduced opening cylindrical portion has a diameter ranging in size to accommodate lead 0.020 to 0.075 in.

3. The invention in accordance with claim 2, wherein the reduced opening cylindrical portion having a diameter of from approximately 0.0455 to 0.047 in.

4. The invention in accordance with claim 1, wherein writing lead is adapted to project through the opening, the reduced opening including a substantially cylindrical portion of predetermined length for minimizing wobbling of the lead when only a relatively small part thereof is not consumed.

5. A one-piece integral, molded plastic tubular member for a writing implement, said member having a rear end and a reduced forward end, said member intermediate its ends having a bore of a first diameter throughout, the forward end including spaced slots caused by pin supports of interengaging surfaces of a mold core and a female mold to prevent breakage of the pin during molding, the forward end having a coaxial reduced opening near the location of the slots and communicating with the bore.

* * * * *